US012695761B2

(12) United States Patent　　(10) Patent No.:　US 12,695,761 B2
　　Butts et al.　　　　　　　　　(45) Date of Patent:　　　Jul. 28, 2026

(54) METHODS AND SYSTEMS FOR CHECKING RESOURCE INTEGRITY

(71) Applicant: Comcast Cable Communications, LLC, Philadelphia, PA (US)

(72) Inventors: Robert O. Butts, Dublin (IE); James Panagos, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 187 days.

(21) Appl. No.: 18/456,337

(22) Filed: Aug. 25, 2023

(65) Prior Publication Data

US 2025/0071121 A1　　Feb. 27, 2025

(51) Int. Cl.
　　*H04L 9/40*　　　(2022.01)
　　*H04L 9/06*　　　(2006.01)
　　*H04L 45/745*　　(2022.01)
　　*H04L 61/4511*　　(2022.01)

(52) U.S. Cl.
　　CPC .......... *H04L 63/123* (2013.01); *H04L 9/0643* (2013.01); *H04L 45/745* (2013.01); *H04L 61/4511* (2022.05)

(58) Field of Classification Search
　　CPC ... H04L 63/123; H04L 9/0643; H04L 45/745; H04L 61/4511; H04L 9/32; G06F 21/64
　　See application file for complete search history.

(56) References Cited

U.S. PATENT DOCUMENTS

| | | | | |
|---|---|---|---|---|
| 7,734,603 B1 * | 6/2010 | McManis | ................ | G06F 3/067 |
| | | | | 707/696 |
| 8,560,503 B1 * | 10/2013 | McManis | ................ | G06F 16/00 |
| | | | | 707/812 |
| 8,634,247 B1 * | 1/2014 | Sprouse | .............. | G06F 12/0246 |
| | | | | 365/185.17 |
| 8,949,994 B2 * | 2/2015 | Amit | ..................... | G06F 21/566 |
| | | | | 726/25 |
| 8,996,482 B1 * | 3/2015 | Singh | ...................... | G06F 16/27 |
| | | | | 707/698 |
| 9,288,169 B2 * | 3/2016 | Schaedler | ............... | H04L 41/00 |
| 9,329,869 B2 * | 5/2016 | Gschwind | ........... | G06F 9/30185 |
| 9,853,819 B2 * | 12/2017 | Truu | ..................... | H04L 9/3239 |
| 11,223,489 B1 * | 1/2022 | Miller | .................. | H04L 9/0897 |
| 12,323,328 B2 * | 6/2025 | Cohen | .............. | H04L 45/74591 |
| 2009/0287835 A1 * | 11/2009 | Jacobson | ........... | H04L 67/1065 |
| | | | | 709/229 |

(Continued)

OTHER PUBLICATIONS

Sahu, Aditya Kumar, et al. "A study on content tampering in multimedia watermarking." SN Computer Science 4.3 (2023): 222.*

(Continued)

*Primary Examiner* — Jimmy H Tran
(74) *Attorney, Agent, or Firm* — BakerHostetler

(57) ABSTRACT

Methods and systems are described for verifying the integrity of resources. A client device may send to a lookup server a request for information associated with accessing a resource. The client device may receive the information. A portion of the information may comprise a cryptographic value associated with the resource. The client device may use the information to send a request for the resource. The client device may receive data in response to the request for the resource and use the cryptographic value to verify the resource.

7 Claims, 8 Drawing Sheets

500

Send a request for a first network address associated with a first resource
502

Receive the first network address, wherein a portion of the first network address includes a first cryptographic value
504

Send, based on the first network address, a request for the first resource
506

Receive data responsive to the request for the first resource
508

Determine whether the first cryptographic value matches a second cryptographic value
510

(56) References Cited

U.S. PATENT DOCUMENTS

| | | | | |
|---|---|---|---|---|
| 2010/0299722 A1* | 11/2010 | Tewari | ................. | H04L 69/329 |
| | | | | 726/3 |
| 2012/0311713 A1* | 12/2012 | Amit | ................. | H04L 63/1466 |
| | | | | 726/25 |
| 2013/0036307 A1* | 2/2013 | Gagliano | ................ | H04L 9/321 |
| | | | | 713/171 |
| 2013/0086362 A1* | 4/2013 | Gschwind | ............ | G06F 9/3826 |
| | | | | 712/205 |
| 2014/0258423 A1* | 9/2014 | Schaedler | .......... | H04L 61/4552 |
| | | | | 709/206 |
| 2014/0280664 A1* | 9/2014 | Sengupta | ............. | G06F 16/137 |
| | | | | 709/212 |
| 2016/0283920 A1* | 9/2016 | Fisher | .................. | H04L 9/3239 |
| 2017/0012943 A1* | 1/2017 | Kaliski, Jr. | ......... | H04L 63/0823 |
| 2017/0033932 A1* | 2/2017 | Truu | .................... | H04L 9/3239 |
| 2017/0180412 A1* | 6/2017 | Mikulski | .............. | H04L 9/3247 |
| 2017/0317997 A1* | 11/2017 | Smith | .................. | H04L 9/3247 |
| 2018/0097631 A1* | 4/2018 | Uppal | ...................... | H04L 9/14 |
| 2021/0021627 A1* | 1/2021 | Tawily | ............... | H04L 63/1433 |
| 2021/0099293 A1* | 4/2021 | Aleksander | ........... | H04L 9/3271 |
| 2022/0027491 A1* | 1/2022 | Wright | .................. | H04L 9/3239 |
| 2022/0198444 A1* | 6/2022 | Mee | ........................ | G06Q 20/22 |
| 2022/0217001 A1* | 7/2022 | Dhanabalan | ............ | H04L 9/088 |
| 2022/0261798 A1* | 8/2022 | Wright | ................. | G06Q 20/065 |
| 2022/0385470 A1* | 12/2022 | Miller | ................. | G06F 21/6218 |
| 2023/0015819 A1* | 1/2023 | Nickels | ............... | H04L 63/0435 |
| 2023/0069934 A1* | 3/2023 | Miller | ................... | H04L 9/0827 |
| 2023/0239140 A1* | 7/2023 | Kaizer | ................. | H04L 9/0825 |
| | | | | 713/171 |
| 2024/0039707 A1* | 2/2024 | McDonald | ........ | H04W 12/0433 |
| 2024/0289783 A1* | 8/2024 | Alsahnawi | .......... | G06Q 20/065 |
| 2024/0323034 A1* | 9/2024 | Kumar | ................. | H04L 9/3268 |
| 2024/0422141 A1* | 12/2024 | Shade | ................ | H04L 63/0442 |
| 2025/0023714 A1* | 1/2025 | Kumar | ................. | H04L 9/0819 |
| 2025/0094546 A1* | 3/2025 | Huang | ................... | H04L 63/12 |

OTHER PUBLICATIONS

Benet, Juan. "Ipfs-content addressed, versioned, p2p file system."
arXiv preprint arXiv:1407.3561 (2014).*

\* cited by examiner

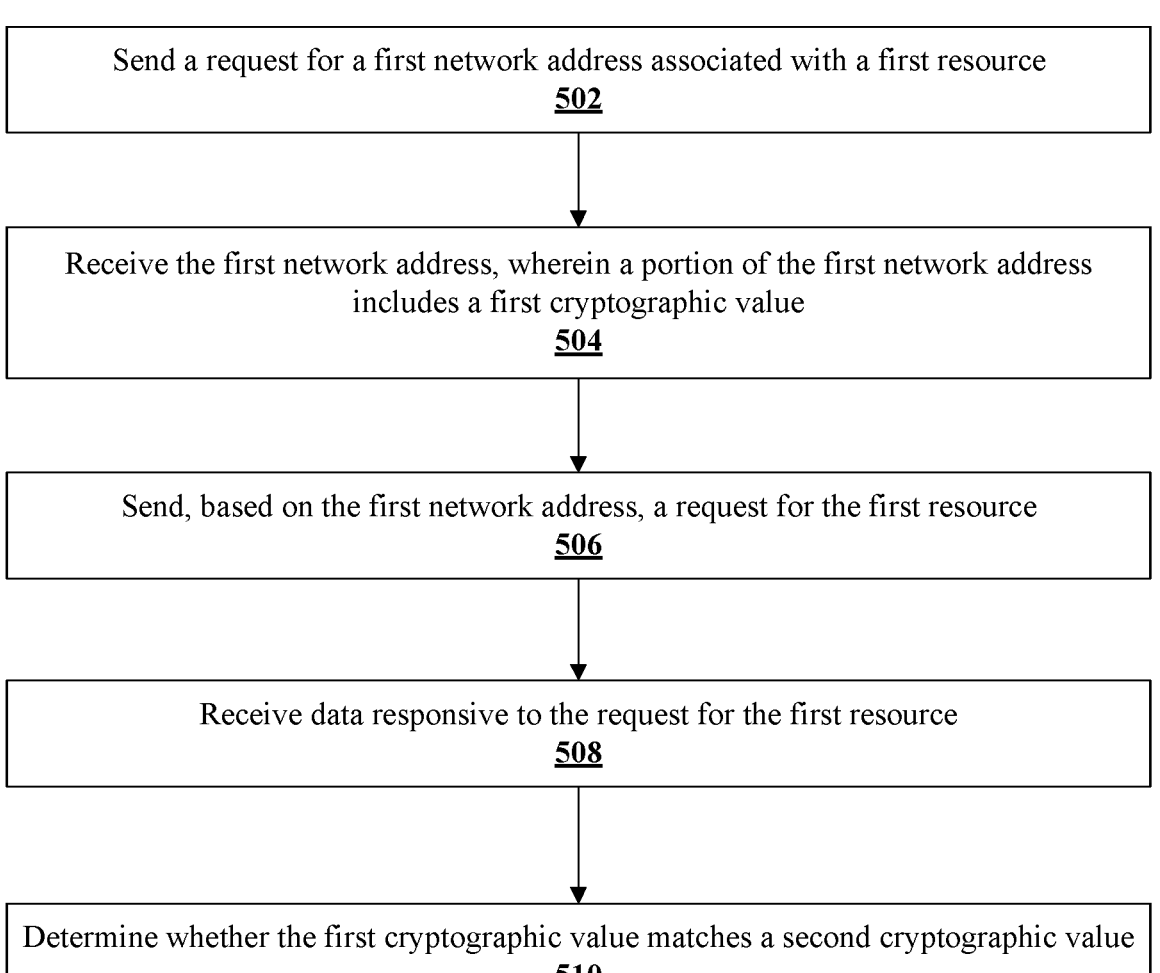

Send a request for a first network address associated with a first resource
502

Receive the first network address, wherein a portion of the first network address includes a first cryptographic value
504

Send, based on the first network address, a request for the first resource
506

Receive data responsive to the request for the first resource
508

Determine whether the first cryptographic value matches a second cryptographic value
510

600

Receive a request for a first network address associated with a first resource
602

Determine a first cryptographic value associated with the first resource
604

Send data comprising the first network address and the first cryptographic value
606

FIG. 7
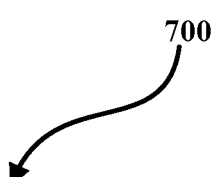
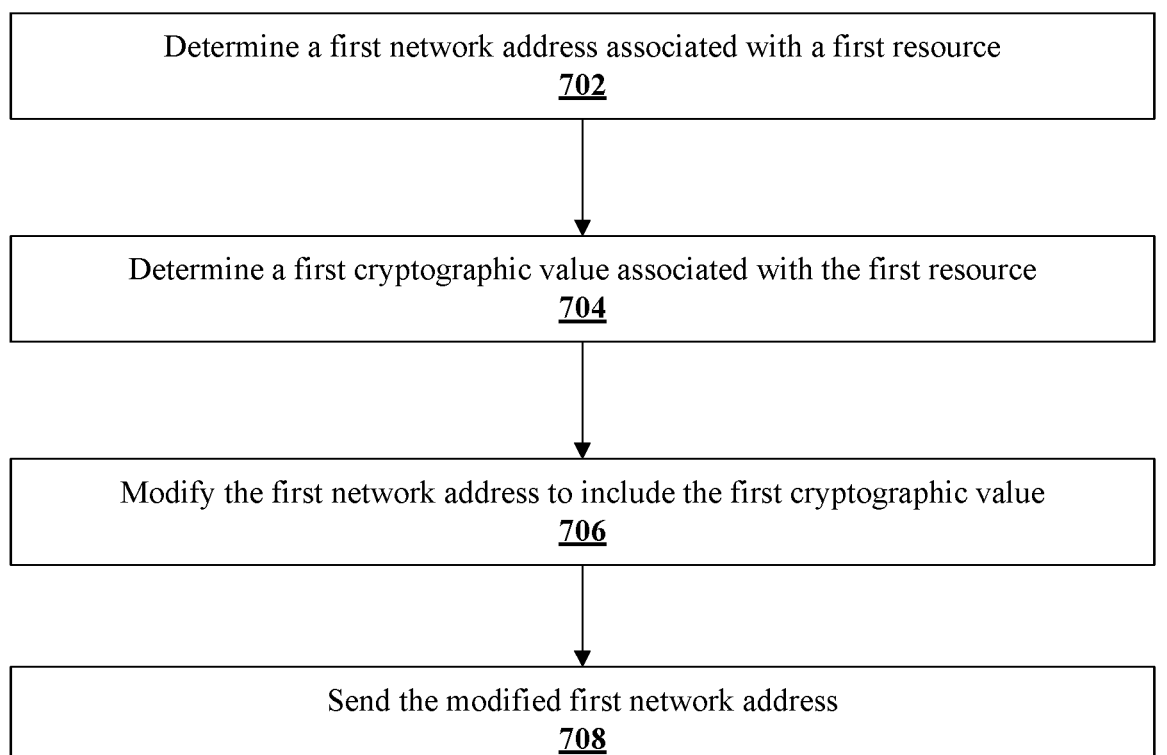
Determine a first network address associated with a first resource
702
Determine a first cryptographic value associated with the first resource
704
Modify the first network address to include the first cryptographic value
706
Send the modified first network address
708

METHODS AND SYSTEMS FOR CHECKING RESOURCE INTEGRITY

BACKGROUND

Client device requests for resources, such as audio and video content, are increasingly being altered with malicious data being returned to the client. It may be uncertain as to whether the client is being provided the resource requested. If a malicious agent intercepts the request, the client may receive a malicious or incorrect resource and have difficulty determining whether the resource received is valid or whether the request was intercepted and manipulated. Accordingly, improvements in validating requested resources are needed.

SUMMARY

Systems and methods are described for validating resources, such as content or other files. A client device may request a resource, such as a content asset. A server (e.g., a lookup server) that receives the request may determine a cryptographic value associated with the resource. In some scenarios, the cryptographic value may be a hash of the requested resource. The server may send a response to the request with an indication of a resource identifier (e.g., URL) for locating the resource. The resource identifier may comprise the cryptographic value. The cryptographic value may be included with the resource identifier to create a unique resource identifier. If the resource identifier includes a network address, such as an internet protocol address, the cryptographic value may be inserted as one or more digits of the network address. The client may retrieve the resource and validate the resource using the resource identifier. The cryptographic value included with the resource identifier may be compared to a cryptographic value computed by the client device based on the received resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part herein.

Additional advantages will be set forth in part in the Detailed Description which follows or may be learned by practice. It is understood that both the foregoing general description and the following Detailed Description are exemplary and explanatory only and are not restrictive.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

FIG. 5 shows an example flow diagram for checking resource integrity.

FIG. 7 shows an example flow diagram for checking resource integrity.

DETAILED DESCRIPTION OF ILLUSTRATIVE EMBODIMENTS

Figure 1:
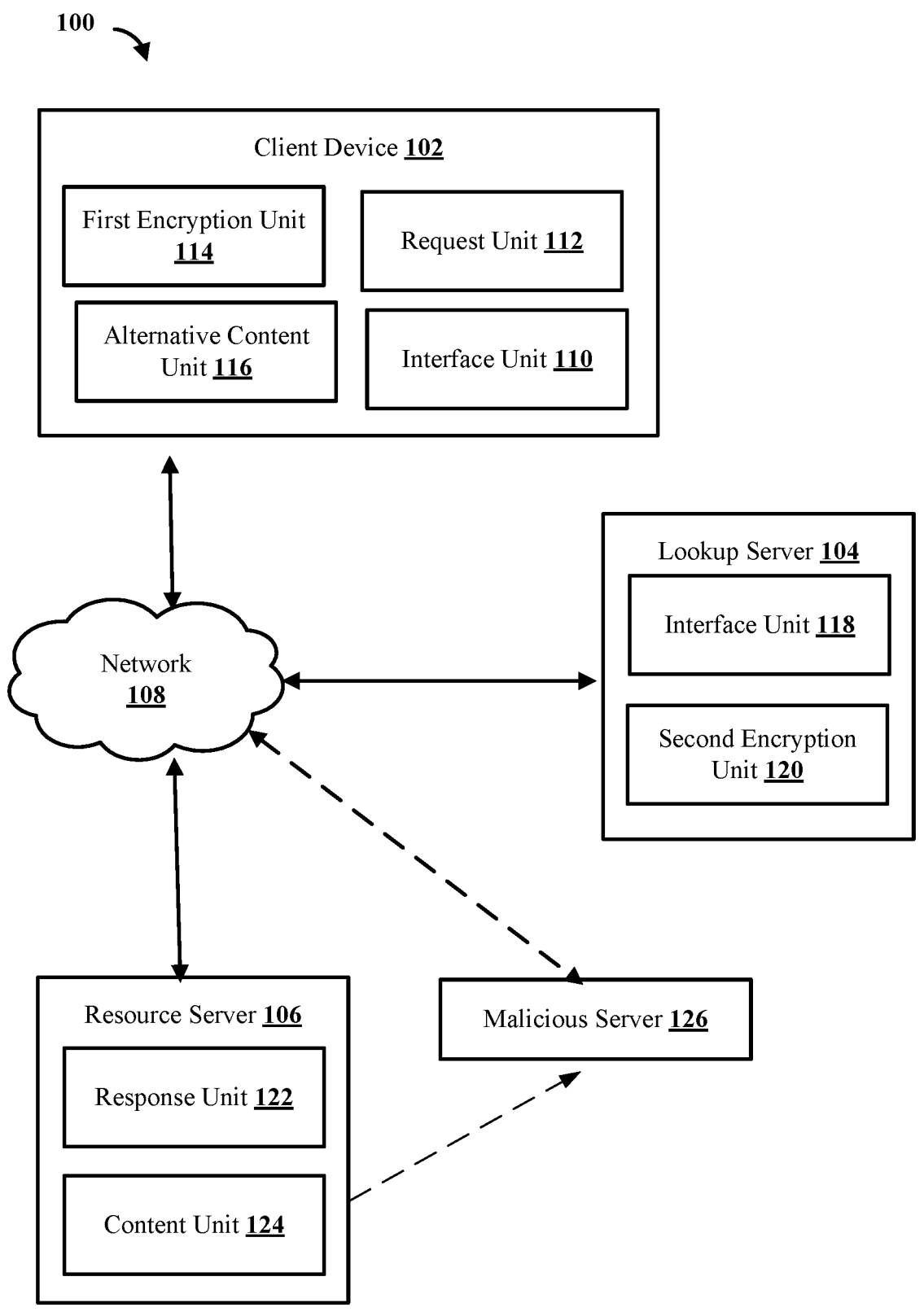
FIG. 1 shows an example system for checking resource integrity.

Systems, methods, and apparatuses are described for verifying that a resource (e.g., content) received by a client device from a resource server is the content requested by the client device. In addition to the data communication channel between the client device and the resource server, the client device may be in data communication with a lookup server. The systems, methods, and apparatuses may verify that the received resource is the same resource as requested.

Systems and methods are described for validating resources (e.g., a content asset). Validating resources may comprise network integrity hashing. A client device may send to a lookup server a request for a network address (e.g., a first network address) associated with a first resource (e.g., a particular content asset). The lookup server may determine the first cryptographic value by computing the first cryptographic value in response to a request (e.g., by using one of the below-mentioned hashing algorithms) on an as-needed basis, and/or may retrieve an already computed cryptographic value from a database configured to store cryptographic values of resources. The database may be stored locally to the lookup server, or stored on a separate server in communication with the lookup server. To compute the first cryptographic value in response to a request on an as-needed basis, the lookup server may download the resource and/or data associated with the resource to input into the hashing algorithm. The first cryptographic value may be determined using a specific hashing algorithm, such as RIPEMD-160, MD4, MD5, SHA-1, SHA-256, SHA-512, SHA3-224, SHA3-256, SHA3-384, SHA3-512, SHAKE128, and SHAKE256. The first cryptographic value may be the output of a cryptographic hash function applied to data of the requested resource (e.g., a first resource). The client device may receive data indicating the first network address and first cryptographic value, where a portion of the first network address includes the first cryptographic value associated with the first resource. The client device may send to a resource server, based on the first network address, a request for the first resource. The resource server may send, and the client device may receive, data in response to the request for the first resource, where the data may include a second resource. The client device may determine a second cryptographic value associated with the second resource, using the same hashing algorithm used to determine the first cryptographic value and based on the data the client device received from the resource server and lookup server. The client device may determine whether the first cryptographic value is equal to the second cryptographic value. If the first and second cryptographic values are the same, this may be an indication that the received resource (e.g., the second resource) is the resource requested (e.g., the first resource). If the received resource is verified (e.g., the first and second cryptographic values are equal), the client device may consider the resource valid and further process the resource. If the resource is verified, the client device may utilize the resource (e.g., cause the resource to be output via display and/or audio). If the first and second cryptographic values are not equal, this may be an indication that the received resource is not the one requested, and/or that the resource and/or request for the resource was altered and/or manipulated. If the first and second cryptographic values are not equal, the client device may perform a different action than if the request were valid, and/or cause an alternative resource to be output, and/or cause no resource to be output, and/or may re-request the resource from the resource server.

The resource server may not have a large enough set of network addresses for a cryptographic value, or using multiple network addresses may be otherwise advantageous. For example multiple disparate network addresses could allow for multiple network paths, which may both be more difficult to intercept in the event an attacker (e.g., intercepting server) has an exploit, as well as providing a higher degree of confidence on success that attacks are not taking place on the network. In multiple address situations, the client device may request from a lookup server a first network address associated with a first resource, which may be desired by a user of the client device. The network address(es) may, for example, be a uniform resource identifier (URI) or a Uniform Resource Locator (URL). The lookup server may determine a first cryptographic value associated with the first resource. The first cryptographic value may have been determined using a hashing algorithm, and may be determined on-the-fly on an as-needed-basis, or may be retrieved from a database, in electronic communication with the lookup server, that has already computed the cryptographic value associated with the first resource. The lookup server may determine address ranges available for use on the one or more available resource server associated with the first resource, and may split the cryptographic value into multiple parts. The lookup server may combine each part of the cryptographic value with the address range, creating multiple unique network identifiers (e.g., containing the address range of the resource server and the first and second parts of the cryptographic value, respectively). As explained below with respect to FIG. 4, the unique network identifiers may be an IPV6 address, such as the ones described below (e.g., 2001:db8:99::3 and 2001:db8:99::5), and the cryptographic value may be a number in the address (e.g., 8), for example. The lookup server may send, and the client device may receive, data indicating the unique network identifiers and the cryptographic value parts (e.g., containing the address range of the resource server and the first and second parts of the cryptographic value). The client device may combine the cryptographic value parts from each network identifier to produce the first cryptographic value. Based on the data indicating the unique network identifiers, the client device may request a resource, including different parts thereof, from one or more resource servers. The client device may receive data including the multiple parts of the resource and the sourcing network address(es), and may concatenate the multiple parts. Using the same hashing algorithm used to determine the first cryptographic value, the client device may determine the cryptographic value (e.g., the second cryptographic value) associated with the concatenated resource received (e.g., the second resource). The client device may determine whether the first cryptographic value is equal to the second cryptographic value. If the first and second cryptographic values are the same, this may be an indication that the received resource (e.g., the second resource) is the resource requested (e.g., the first resource). If the received resource is verified (e.g., the first and second cryptographic values are equal), the client device may consider the resource valid and further process the process. If the resource is verified, the client device may utilize the resource (e.g., cause the resource to be output via display and/or audio). If the first and second cryptographic values are not equal, this may be an indication that the received resource is not the one requested, and that the resource and/or request for the resource was altered and/or manipulated. If the first and second cryptographic values are not equal, the client device may perform a different action than if the request were valid, cause an alternative resource to be output, cause no resource to be output, re-request the resource from the resource server, or any combination thereof.

The environment in which the request for a resource is carried out may be a multi-tenant environment, such that there are multiple domains from which the resource may be retrieved (e.g. Xfinity®, Netflix®, or something of the like). Each domain may be associated with a range of network addresses from which a resource may be sent to a client device, and to which a request for a resource may be sent. A network address may be expanded to be combined with a cryptographic value, or a portion thereof to create a unique network identifier. Cryptographic values and Unique network identifiers associated with resources available at a particular domain may exhibit certain hashing characteristics and/or patterns that are different from resources available at a different domain. The unique network identifier for a particular domain may have a predetermined structure or characteristics, such as the number of bits or the hashing algorithm to use, for example. The cryptographic value, or a portion thereof, associated with a resource may be based on the domain from which the resource will be received. Cryptographic values associated with different resources that will be retrieved from the same resource server and/or different resource servers associated with the same domain may share commonalities that are distinctive to resources from a particular domain, from which the resource will be received from. A cryptographic value For example, resources may be retrievable from a resource server associated with one of a plurality of different domains, such as Xfinity®, Netflix®, or something of the like. The cryptographic value associated with the resource may be used to determine that the resource is being retrieved from an Xfinity® resource server, for example. A cryptographic value associated with a resource that is being retrieved from an Xfinity® resource server may share commonalities with, or be the same as, a cryptographic value associated with a different resource also being retrieved from an Xfinity® resource server. The commonality present in the cryptographic value(s) associated with the different resources may provide an indication that they are resources to be retrieved from an Xfinity® resource server, for example. Each resource to be retrieved from a resource server associated with a particular domain (e.g., Xfinity®, Netflix®, or something of the like) may have the same cryptographic value, or portion thereof.

FIG. 1 shows an example system 100 for verifying content received on a client device. The system 100 may comprise a client device 102, a lookup server 104, and one or more resource servers 106. The client device 102 may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like. The client device 102, the lookup server 104, and the one or more resource servers 106 may be in communication via a network 108. The network 108 may comprise a packet-switched network, a non-packet switched network, and/or the like. The network

108 may comprise wireless links and/or wired links. The network 108 may comprise one or more routers, switches, gateways, access points, multiplexers and/or the like.

The client device 102 may comprise an interface unit 110 configured to output (e.g., render via a display of a user device, transmit to a display device) a resource to a user of the client device 110. The interface unit 110 may comprise an application, such as a web browser, a mobile application, an application on a media device (e.g., a set top box, a television, a streaming device). The client device 102 may receive a request for a resource. The request may be received from a user of the client device 102 via an application. The request may be received from another device (e.g., a remote, second screen device, such as a smart phone) in communication with the client device 102. The resource may comprise video, audio, text (e.g., a web page, a document), and/or the like. The resource may comprise a content stream, such as a video stream, a packet switched content stream, and/or the like. The resource may be associated with a particular domain, (e.g., Netflix, Amazon, etc.).

The client device 102 may comprise a request unit 112 configured to request a resource from a server, such as a resource server. The client device 102 may request the resource based on data received from a lookup server 104, such as data indicating a resource identifier and cryptographic value associated with the requested resource. In the data received from the lookup server 104, the cryptographic value may be appended to the resource identifier. The client device 102 may be configured to ignore the cryptographic value when requesting the resource based on the resource identifier. If the client device 102 ignores the cryptographic value, the first cryptographic value may be a network address (e.g., layer 3 address, IP address, or other address) destination address regardless of the upper layer (HTTP) location information. The client device 102 may be configured to use various protocols, such as internet protocol, Transmission Control protocol, Hypertext Transfer Protocol, and/or the like. The application may cause the client device to transmit a request for a resource. The client device 102 may transmit the request to the resource server 106.

The client device 102 may comprise a first encryption unit 114 to determine a cryptographic value associated with a resource received by the client device (e.g., a second cryptographic value). The client device 102 may compare the cryptographic value associated with the received resource to a cryptographic value associated with the resource requested by the client device 102 (e.g., a first cryptographic value) to determine if the received resource is the resource requested. The first encryption unit 114 may receive data indicating a cryptographic value associated with a resource requested by the user (e.g., a first cryptographic value). The data may indicate a resource identifier (e.g., a first network address) associated with the resource. The data may be received from the lookup server 104 by the first encryption unit 114 of the client device 102. The cryptographic value may be the output of a cryptographic hash function applied to data of the requested resource (e.g., a first resource). Examples of hash functions include RIPEMD-160, MD4, MD5, SHA-1, SHA-256, SHA-512, SHA3-224, SHA3-256, SHA3-384, SHA3-512, SHAKE128, and SHAKE256. The first encryption unit 114 may receive from the lookup server 104 data indicating the hash function used to determine the first cryptographic value.

The first encryption unit 114 may receive data from the one or more resource servers 106. The data received from the one or more resource servers 106 may include a second resource. The first encryption unit 114 may determine a cryptographic value (e.g., a second cryptographic value) associated with the received resource (e.g., the second resource). The second cryptographic value may be determined by applying the hash function (e.g., the same hash function used to determine the first cryptographic value) to data associated with the second resource (e.g., the same type of data used to determine the first cryptographic value associated with the first resource). The first encryption unit 114 may compare the first and second cryptographic values. If the first and second cryptographic values are equal, this may indicate the first and second resources are the same and/or that the resource requested by the user is the resource received by the client device. If the first and second cryptographic values are the same, this may indicate that the request for the resource from the client device 102 to a resource 106 was not altered by a malicious server 126. The malicious server 126 may intercept the request from the client device 102 to the resource server 106 and may attempt to return malware (e.g., something other than the requested resource) to the client device 102. The malicious server 126 may intercept the data sent from the resource server 106 to the client device and substitute in malware to be sent to the client device 102. Conversely, if the first and second cryptographic values are not the same, this may indicate that the first and second resources are not the same (e.g., the resource received is not the resource requested) and/or that the data received by the client device 102 with the second resource contains malware.

The client device 102 may comprise an alternative content unit 116 configured to determine an alternative resource for the client device 102 to output if the cryptographic values associated with the requested and received resources are not equal. The alternative resource may be an error message, a particular search engine, or other web page set by the user or developer/manufacturer of the client device 102 or software thereon used to request the resource.

The lookup server 104 may comprise an interface unit 118 configured to process requests, such as from the client device 102. The interface unit 118 may be configured to send data to the client device 102, for example, data including an asset identifier (e.g., first network address) and cryptographic hash value (e.g., first cryptographic value) associated with a resource requested by the client device 102. The data indicating the asset identifier may be sent to the client device 102 together with the cryptographic hash value. The cryptographic hash value may be appended to the asset identifier. The data may be received by the first encryption unit 114 of the client device 102. The client device 102 may use the data to request a resource from a resource server. Communication between the client device 102 and the lookup server 104 may be communications based on a protocol, such as hypertext transfer protocol. For example, the lookup server 104 may be configured to receive requests for an asset identifier, such as the URI, from the lookup server 104, which may be a domain name system (DNS) lookup service, a video manifest generator, a webpage generator, or the like. The lookup server 104 may be configured to send the asset identifier joined with a cryptographic value to the client device 102.

The lookup server 104 may comprise a second encryption unit 120 to determine a cryptographic value associated with a resource requested by the client device (e.g., a first cryptographic value). The cryptographic value associated with the resource may be compared with a cryptographic value associated with a resource received by the client device 102 from the resource server 106 (e.g., a second cryptographic value) to determine if the received resource is the resource requested. The second encryption unit 120 may send data indicating a cryptographic value associated with a resource requested by the user (e.g., a first cryptographic value). The second encryption unit 120 may send data indicating the cryptographic hash to the interface unit 118. The cryptographic value may be the output of a cryptographic hash function applied to data associated with the requested resource (e.g., a first resource). Examples of hash functions include RIPEMD-160, MD4, MD5, SHA-1, SHA-256, SHA-512, SHA3-224, SHA3-256, SHA3-384, SHA3-512, SHAKE128, and SHAKE256. The lookup server may determine the cryptographic value by computing the cryptographic value in response to a request (e.g., by using one of the aforementioned hashing algorithms) on an as-needed basis, and/or may retrieve an already computed cryptographic value from a database configured to store cryptographic values of resources. The database may be stored locally to the lookup server, or stored on a separate server in communication with the lookup server. To compute the cryptographic value in response to a request on an as-needed basis, the lookup server may download the resource and/or data associated with the resource to input into the hashing algorithm. The second encryption unit 120 may send to the interface unit 118 data indicating the hash function used to determine the first cryptographic value. The lookup server 104 may include a Domain Name System (DNS) lookup, a streaming video manifest generator service, a streaming video manifest manipulator service, an HTML webpage templating service, an HTML webpage manipulation service, a streaming video advertisement insertion service, and/or an HTML webpage advertisement insertion service.

The resource server 106 may comprise a response unit 122 configured to process requests, such as from the client device 102. The requests may be requests based on a protocol, such as hypertext transfer protocol. For example, the resource server 106 may be configured to process requests from an application on the client device 102. The requests may be requests for a specific resource, such as a specific webpage or streaming content. The resource server may be configured to check the cryptographic value received from the client device against a cryptographic value known by the resource server 106 for the requested resource. Based on this check, for example, by comparing the a known cryptographic value of the requested resource to the cryptographic value in the URL path, the resource server 106 may determine if the client device 102 that sent the request for the resource is legitimate or malicious. This can be used, for example, to validate clients, reject requests not authorized by the lookup service (avoiding authentication on the resource server), or to mitigate Distributed Denial-of-Service (DDoS) attacks.

The resource server 106 may comprise a resource unit 124 configured to access and/or store resources. The resource may comprise a content stream, content file, content item, content asset, and/or the like. The resource may comprise video (e.g., a video stream, a video asset, and a video item), audio, an application, text, an image, computer-executable code, and/or the like. The resource server 106 may store at least a portion of the resource in a data store (e.g., database). In some scenarios, the resource may be stored remotely. The resource server 106 may be configured to query, access, retrieve, and/or store resources in the data store (e.g., whether local or remote). The resource may comprise content for an application, such as a mobile application, an application on a media device (e.g., set top box, content streaming device, television), and/or the like. The resource server 106 may comprise a node of a plurality of nodes configured for storing a plurality of resources. One or more of the plurality of nodes may be associated with a different resource. One or more of the plurality of nodes may be specific to a particular domain (e.g., Netflix).

It should be understood that the functionality of the resource server 106 may be implemented via a single device or multiple devices (e.g., that may be remotely located from each other). The functionality of the client device 102 may be implemented via multiple devices. For example, a gateway device or other intermediary device may determine blackout information and restrict access to the requested content.

Figure 2:
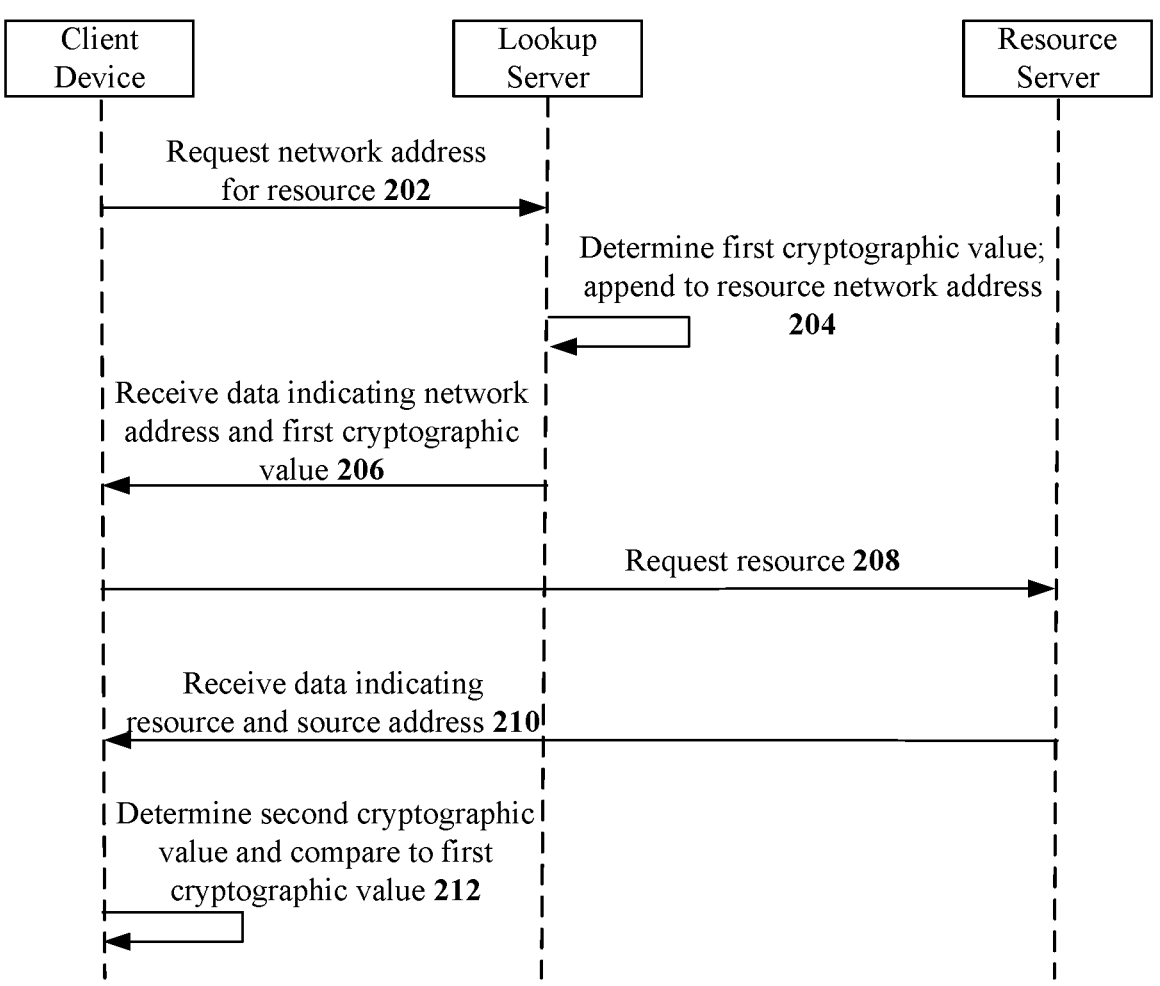
FIG. 2 shows an example flow diagram for checking resource integrity.

FIG. 2 shows a flow diagram of an example method 200 for checking resource integrity. A system and/or computing environment, such as the system 100 of FIG. 1 and/or the computing environment of FIG. 8, may be configured to perform the method 200. The method 200 may be performed in connection with the system illustrated in FIG. 1. Any step or combination of steps of the method 200 may be performed by any of the devices shown in FIG. 1, such as the client device 102, lookup server 104, and/or resource server 106. Any of the features of the methods of FIGS. 3-7 may be combined with any of the features and/or steps of the method 200 of FIG. 2.

At step 202, a request for a network address (e.g., asset identifier, universal resource identifier (URI)) of a resource (e.g., a first resource) may be sent. The request may be sent from a client device. The network address requested at step 202 may be a first network address. The request may be received by a lookup server, such as a Domain Name System (DNS) lookup, a video manifest generator, or a webpage generator. The client device may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like.

At step 204, the lookup server may determine a cryptographic value (e.g., a first cryptographic value) associated with the first resource, which may be included in the first network address to produce a unique network address. For example, the resource owner (e.g., the owner of the resource server) may have a range of network addresses for its resources stored on the resource server, such as an IPV6 CIDR/48. The cryptographic value may be a cryptographically secure hash. The cryptographic value may be determined from a specific hashing algorithm or protocol, such as include RIPEMD-160, MD4, MD5, SHA-1, SHA-256, SHA-512, SHA3-224, SHA3-256, SHA3-384, SHA3-512, SHAKE128, and SHAKE256. The lookup server may determine the cryptographic value by computing the cryptographic value in response to a request (e.g., by using one of the aforementioned hashing algorithms) on an as-needed basis, and/or may retrieve an already computed cryptographic value from a database configured to store cryptographic values of resources. The database may be stored locally to the lookup server, or stored on a separate server in communication with the lookup server. To compute the cryptographic value in response to a request on an as-needed basis, the lookup server may download the resource and/or data associated with the resource to input into the hashing algorithm. At step 206, the client device may receive data indicating the first network address and the first cryptographic value joined with the first network address such that a portion of the first network address includes the first cryptographic value of the requested resource. The first cryptographic value may be sent from the lookup server.

At step 208, a request may be sent to the resource server for the first resource based on the first network address (e.g., the unique network address included with a cryptographic value associated with the first resource). The request may be sent by the client device and may be received by the resource server associated with the first resource. At step 210, the resource server may send, and the client device may receive, data including a resource (e.g., the received resource or the second resource).

At step 212, the cryptographic value associated with the received resource may be computed, which may be the second cryptographic value. The cryptographic value associated with the received resource may be compared with the first cryptographic value. The second cryptographic value may be determined using the same hash function used to determine the first cryptographic value, for example, by the lookup server. The second cryptographic value may be determined by the client device. The second cryptographic value may be based on the second resource. The client device may compare the first cryptographic value to the second cryptographic value. If the requested and received cryptographic values (e.g., first and second cryptographic values, respectively) match, this may be an indication that the resource received is legitimate and was not altered or manipulated by a malicious attacker. In other words, the matching cryptographic values may indicate the requested and received (e.g., first and second, respectively) resources are the same. If the requested and received resources are matching, the client device may cause the resource to be output to a user of the client device. If the requested and received resources are matching, the client device may utilize, apply, or take action based on the resource. If the first and second cryptographic values are not the same, this may be an indication that the resource request sent from the client device was altered, and that the client device did not receive the resource requested.

Figure 3:
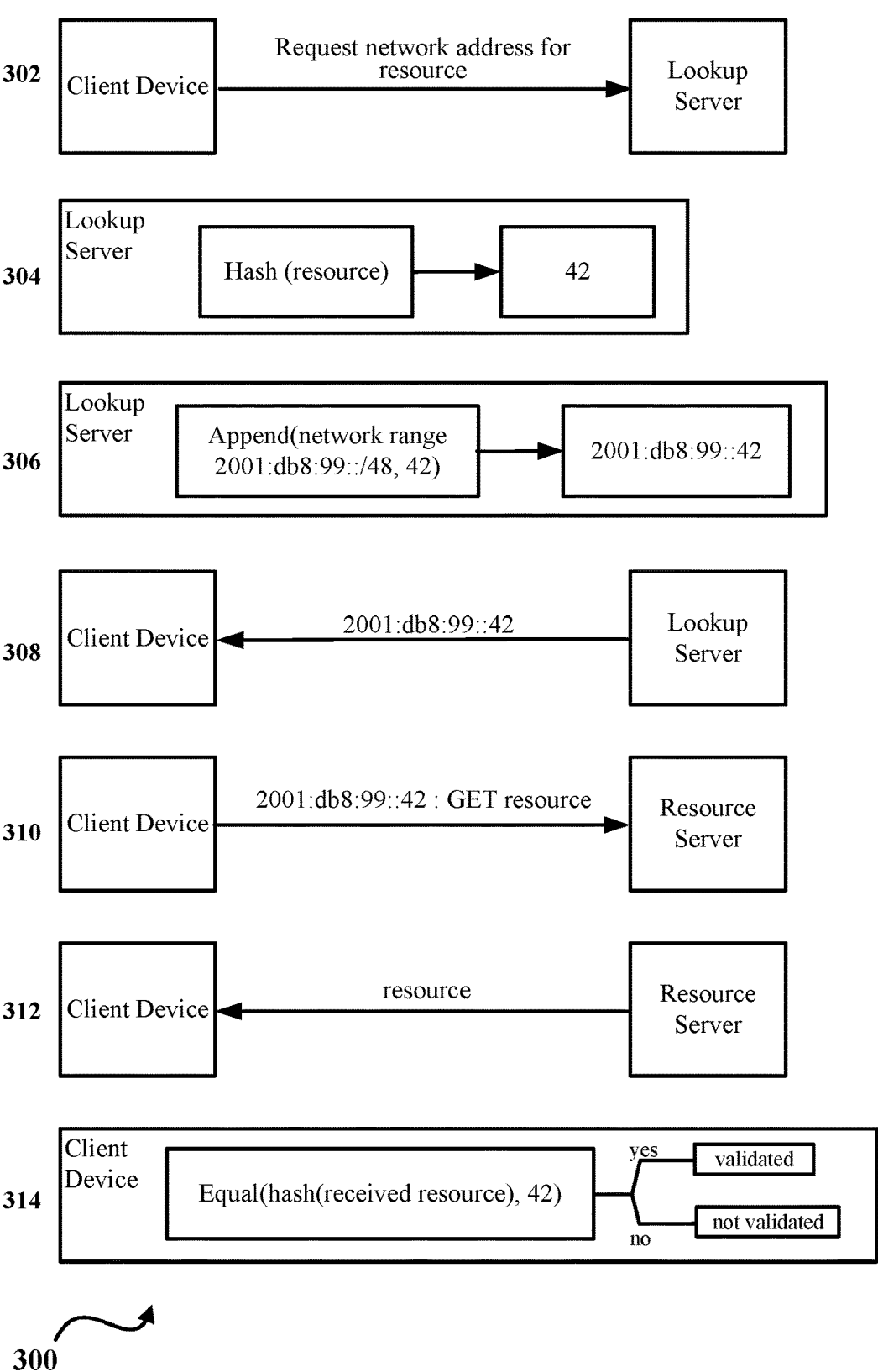
FIG. 3 shows an example flow diagram for checking resource integrity.

FIG. 3 shows a flow diagram of an example method 300 for checking resource integrity. A system and/or computing environment, such as the system 100 of FIG. 1 and/or the computing environment of FIG. 8, may be configured to perform the method 300. The method 300 may be performed in connection with the system illustrated in FIG. 1. Any step or combination of steps of the method 300 may be performed by any of the devices shown in FIG. 1, such as the client device 102, lookup server 104, and/or resource server 106. Any of the features of the methods of FIGS. 2 and 4-7 may be combined with any of the features and/or steps of the method 300 of FIG. 3.

At step 302, a request for a network address (e.g., asset identifier, universal resource identifier (URI)) of a resource (e.g., a first resource) may be sent. The request may be sent from a client device. The network address requested at step 302 may be a first network address. The request may be received by a lookup server, such as a Domain Name System (DNS) lookup, a video manifest generator, or a webpage generator. The client device may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like.

At step 304, the lookup server may determine a cryptographic value (e.g., a first cryptographic value) associated with the first resource. The cryptographic value may be determined from a specific hashing algorithm or protocol, such as include RIPEMD-160, MD4, MD5, SHA-1, SHA-256, SHA-512, SHA3-224, SHA3-256, SHA3-384, SHA3-

512, SHAKE128, and SHAKE256. The lookup server may determine the cryptographic value by computing the cryptographic value in response to a request (e.g., by using one of the aforementioned hashing algorithms) on an as-needed basis, and/or may retrieve an already computed cryptographic value from a database configured to store cryptographic values of resources. The database may be stored locally to the lookup server, or stored on a separate server in communication with the lookup server. To compute the cryptographic value in response to a request on an as-needed basis, the lookup server may download the resource and/or data associated with the resource to input into the hashing algorithm. The cryptographic value may be 42, for example.

At step 306, the address range of the resource server associated with the requested resource may be determined. In an example, the address range of the resource server may be 2001:db8:99::/48. And the lookup server may include the cryptographic value with the network address to create a unique network identifier (e.g., the first network address) of, for example, 2001:db8:99::42. At step 308, the client device may receive data indicating the first network address and the first cryptographic value joined with the first network address such that a portion of the first network address includes the first cryptographic value of the requested resource. Based on the received data, the client device may know the resource is available at a /48, and thus 80 bits are available for the hash, and therefore the resource hash is 42. The data indicating the first cryptographic value and first network address may be sent from the lookup server.

At step 310, the client may request from the resource server the first resource. The request may be based on the first network address (e.g., the unique network address joined with a cryptographic value). The request may be sent by the client device and may be received by the resource server associated with the first resource. The resource server may be one of a plurality of other resource servers associated with other resources. At step 312, the client may receive data including a resource (e.g., second resource). The second resource may be sent from the resource server at the first network address. Alternatively, the second resource may have been received from a malicious server, which can be determined once the cryptographic value associated with the second resource is determined and compared to the first cryptographic value.

At step 314, the client device may determine the cryptographic value (e.g., second cryptographic value) associated with the second resource and compare the second cryptographic value to the first cryptographic value associated with the first resource. The client device may use the same hash function used to determine the first cryptographic value. If the first and second cryptographic values are equal (e.g., the numbers match), this may be an indication that the received resource (e.g., the second resource) is the requested resource (e.g., the first resource) and that the request and/or return of request was not altered by a malicious server. If the first and second cryptographic values are not equal (e.g., the numbers do not match), this may be an indication that the received resource (e.g., the second resource) is not the requested resource (e.g., the first resource) and that the request and/or return of request was intercepted and/or altered by a malicious server. If the second resource is not the resource requested, the client device may reject the second resource and not cause the second resource to be output, and instead may perform a different action than if the request were valid, and/or cause an alternative resource to be output.

By way of example, the client device may have received data indicating the first cryptographic value was 42 using a particular hash function. The client device may determine that the second cryptographic value is 42 using the same hash function that was used to determine the first cryptographic value. Because the first and second cryptographic values are equal, this may be an indication that the first and second resources are the same. Alternatively, the client device may determine that the second cryptographic value is 84 using the same hash function that was used to determine the first cryptographic value of 42. Because the first and second cryptographic values are not equal, this may be an indication that the first and second resources are not the same, and that the request and/or return of the request for the resource was intercepted and/or altered.

Figure 4:
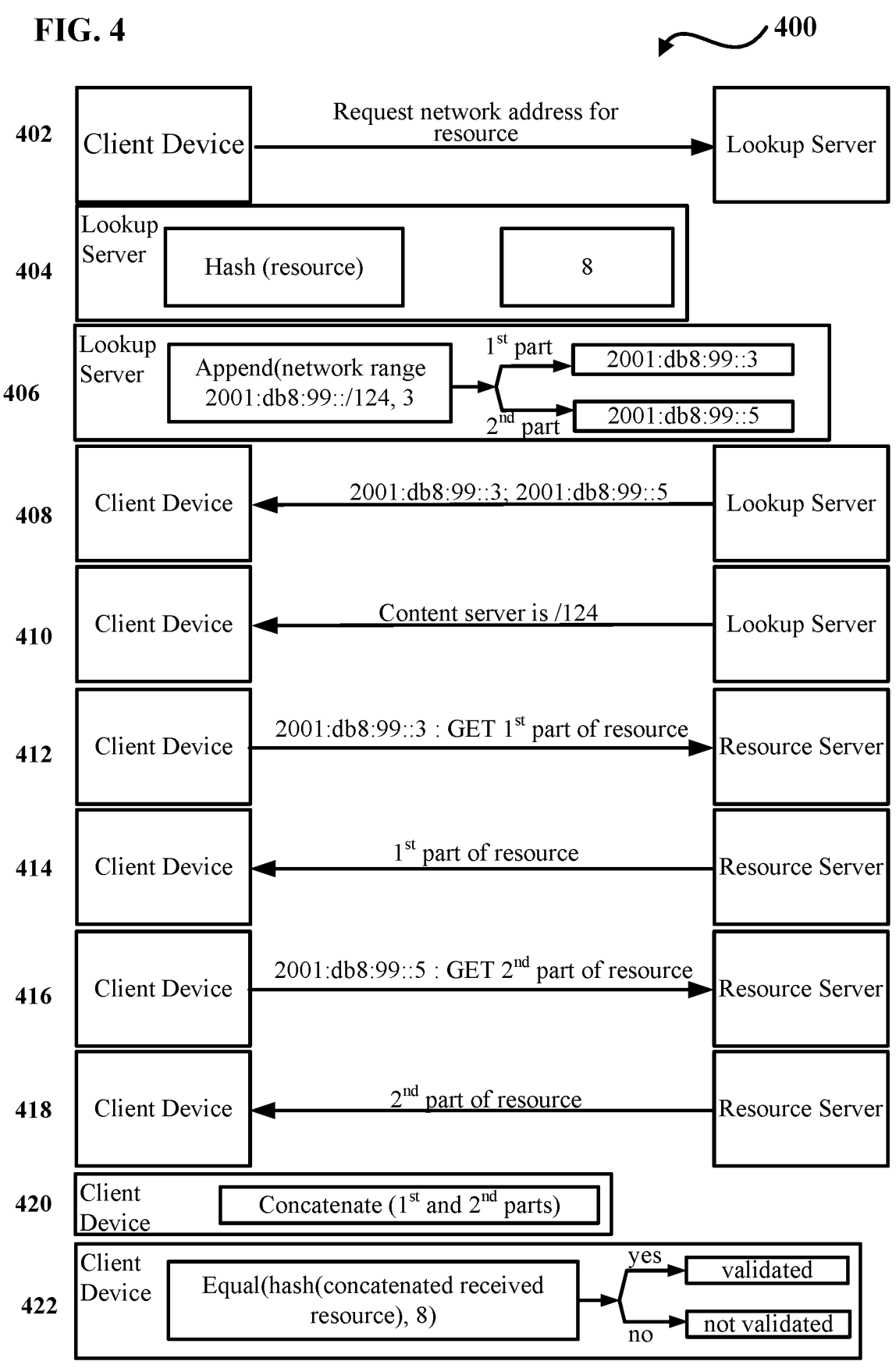
FIG. 4 shows an example flow diagram for checking resource integrity.

FIG. 4 shows a flow diagram of an example method 400 for checking the integrity of a resource with multiple unique network addresses. A system and/or computing environment, such as the system 100 of FIG. 1 and/or the computing environment of FIG. 8, may be configured to perform the method 400. The method 400 may be performed in connection with the system illustrated in FIG. 1. Any step or combination of steps of the method 400 may be performed by any of the devices shown in FIG. 1, such as the client device 102, lookup server 104, and/or resource server 106. Any of the features of the methods of FIGS. 2-3 and 5-7 may be combined with any of the features and/or steps of the method 400 of FIG. 4.

At step 402, a request for a network address (e.g., asset identifier, universal resource identifier (URI)) of a resource (e.g., a first resource) may be sent. The request may be sent from a client device. The network address requested at step 402 may be a first network address. The request may be received by a lookup server, such as a Domain Name System (DNS) lookup, a video manifest generator, or a webpage generator. The client device may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like.

At step 404, the lookup server may determine a cryptographic value (e.g., a first cryptographic value) associated with the first resource. The cryptographic value may be determined from a specific hashing algorithm or protocol, such as RIPEMD-160, MD4, MD5, SHA-1, SHA-256, SHA-512, SHA3-224, SHA3-256, SHA3-384, SHA3-512, SHAKE128, and SHAKE256. The lookup server may determine the cryptographic value by computing the cryptographic value in response to a request (e.g., by using one of the aforementioned hashing algorithms) on an as-needed basis, and/or may retrieve an already computed cryptographic value from a database configured to store cryptographic values of resources. The database may be stored locally to the lookup server, or stored on a separate server in communication with the lookup server. To compute the cryptographic value in response to a request on an as-needed basis, the lookup server may download the resource and/or data associated with the resource to input into the hashing algorithm. The cryptographic value may be 8, for example.

At step 406, the address range of the resource server associated with the requested resource may be determined. For example, the address range of the resource server may be 2001:db8:99::/124. The address range may be determined by the lookup service. The lookup server may split the cryptographic value into multiple parts (e.g., 3 and 5). The lookup server may combine each part of the cryptographic value with the address range, creating, for example, first and second unique network identifiers (e.g., containing the address range of the resource server and the multiple parts of the cryptographic value) of, for example, 2001:db8:99::3 and 2001:db8:99::5. At step 408, the client device may receive data indicating the first and second unique identifiers and the cryptographic value parts (e.g., 3 and 5). The client device may receive the data from the lookup server. At step 410, the client device may, based on the received data, determine that the resource server is /124. Based on the first and second unique identifiers, the client device may determine that the cryptographic value is 8 because 3+5=8. The exemplary cryptographic values here are small for the sake of simplicity, however, the values in practice may be much larger.

At step 412, the client device may request from a resource server the first part of the resource based on the first unique identifier, for example 2001:db8:99:3. At step 414, the client device may receive from the resource server data including the first part of the resource. At step 416, the client device may request from a resource server the second part of the resource based on the second unique identifier, for example 2001:db8:99::5. At step 418, the client device my receive from the resource server data including the second part of the resource. It should be appreciated that the first and second parts of the resource may be requested and received from different resource servers of a plurality of resource servers.

At step 420, the client device may concatenate the first and second parts of the received resource to create a completed resource (e.g., the second resource). At step 422, using the same hash algorithm used to determine the first cryptographic value, the client device may determine a second cryptographic value associated with the second resource and compare the second cryptographic value to the first cryptographic value. If the first and second cryptographic values are equal (e.g., the numbers match), this may be an indication that the received resource (e.g., the second resource) is the requested resource (first resource) and that the request and/or return of request was not altered by a malicious server. If the first and second cryptographic values are not equal (e.g., the numbers do not match), this may be an indication that the received resource (e.g., the second resource) is not the requested resource (e.g., the first resource) and that the request and/or return of request was intercepted by a malicious server. If the second resource is not the resource requested, the client device may reject the second resource and not cause the second resource to be output, and instead may perform a different action than if the request were valid, and/or cause an alternative resource to be output.

In instances where the resource server does not have a large enough address range for a cryptographic value, the cryptographic value may be split across multiple network addresses, and fragments of the resource served from each address. For example, the lookup server may indicate the requested resource is associated with a cryptographic value of a 160-bit RIPEMD-160 hash, and an IPV6 /48 which contains 80 bits. The lookup server may send and the client device may receive two network addresses for the resource, each of which is the /48 upper address with half the 160-bit cryptographic value included with the address. The client device may then make two requests to the resource server. The client device may join the resources together upon receiving them. The client device may determine the cryptographic value associated with the combined resource. The client device may compare the cryptographic value to the two 80-bit cryptographic value parts in the two network addresses the client device received from the lookup service.

If equal, the client device may determine that the network request for the resource was not altered. The use of multiple addresses may be advantageous even if the resource server has a sufficiently large address space for the hash that may be used. Multiple disparate network addresses could allow for multiple network paths, which may be more difficult to intercept to exploit by an attacker, as well as providing a higher degree of confidence on success that attacks are not taking place on the network.

Hash routing can be injected into media which contain links to other media, such as HTML or streaming video manifest files. This may avoid a separate lookup. For example, rather than using DNS or another lookup mechanism, the server, or some server in a networked set of services, generating and/or serving the HTML can insert the hashed network address as links in the HTML, rather than a Fully Qualified Domain Name (FQDN). So instead of a traditional domain name link, such as: <!DOCTYPE html><html><body><a href="https://my-domain.example. net/foo">click here</a></body></html>, the server will instead serve the following where 2001:db8:99::42 represents the hashed network address: <!DOCTYPE html><html><body><a href="http://*2001:db8:99::42*/ foo">click here</a></body></html>.

To inject hash routing into media, whenever the server, or networked set of servers, is going to generate the HTML, like when requested by a client device, or as a 'pre-generation', the server may follow the steps of the "lookup server" as discussed above, followed by including the computed network address with the cryptographic value in the final HTML text. The HTML generating service may obtain a cryptographic value of the resource, for example, by computing the cryptographic value in response to a request on an as-needed basis or having stored (or access to a stored) precomputed cryptographic value. Access to the resource, or data associated with the resource, may be required to compute the cryptographic value in response to a request on an as-needed basis. The cryptographic value may be 42, for example. The HTML generating service may determine the address range of the content server, such as 2001:db8:99::/48. The HTML generating service may include the cryptographic value in the resource server's address range, making the example address 2001:db8:99:: 42. The HTML generating service may inject the computed address, 2001:db8:99::42, into the HTML text to serve. The inclusion of the cryptographic value in the address range may be done via a software templating system.

Similar to HTML, streaming video protocols such as HLS and DASH consist of manifest files which contain links to video files. Rather than using DNS or other lookup mechanisms, the server, or a server in a networked set of services, generating and/or serving the video manifest can insert a network address included with a cryptographic value as links in the manifest text, rather than a Fully Qualified Domain Name (FQDN). For example, an HLS manifest file with a traditional domain name link might look like:

```
#EXTM3U
#EXT-X-VERSION:7
#EXT-X-TARGETDURATION:3
#EXT-X-MEDIA-SEQUENCE:809053430
#EXTINF:2.002,809053430
frag-1234.mp4
#EXTINF:2.002,809053431
http://my-server.example.net/frag-5678.mp4
```

Instead, the server may serve the following where 2001: db8:99:42 and 2001:db8:99::96 represents the hash IP of the video files video-frag-1234.mp4 and video-frag-5678.mp4 respectively:

```
#EXTM3U
#EXT-X-VERSION:7
#EXT-X-TARGETDURATION:3
#EXT-X-MEDIA-SEQUENCE:809053430
#EXTINF:2.002,809053430
http://[2001:db8:99::42]/video-frag-1234.mp4
#EXTINF:2.002,809053431
http://[2001:db8:99::96]/video-frag-5678.mp4
```

Note the first example uses a relative path and an absolute path. Because the IP hash method involves the IP, the IP hash method uses absolute paths. To do this, whenever the server, or networked set of servers, is going to generate the video manifest, such as when requested by a client device, or some time before as a 'pre-generation,' the same steps as the "lookup server" described above may be observed, followed by finally injecting the computed hash IP in the final manifest text. The video manifest generating service may obtain a cryptographic value of the resource, for example by computing the cryptographic value in response to a request on an as-needed basis and/or by having stored, or access to a stored, precomputed cryptographic value. Access to the resource, or data associated with the resource, may be required to compute the cryptographic value on as-needed basis. The cryptographic value may be 42. The video manifest generating service may determine the address range of the resource server, such as 2001:db8:99::/48. The video manifest generating service may include the cryptographic value with the resource server's address range. The address in the example becomes 2001:db8:99::42. The video manifest generating service may inject the computed address, 2001:db8:99::42, into the manifest text to serve. The injection may be done via a software templating system. This may require either the address range be large enough for a single hash and not the multiple address flow described above, or else a protocol or protocol extension which permits multiple links for a single object.

For example, the following HTML could be served: <!DOCTYPE html><html><body><a href="http://*2001: db8:99::42*/foo" integrity-address-2="[2001:db8:99::52]" integrity-address-3="[2001:db8:99::62]">click here</a> </body></html>. An HTML client unaware of "Resource Integrity Checking" may ignore the integrity-address-2 and integrity-address-3 attributes, and the request would work albeit without the benefits described herein. A client device aware of the "Resource Integrity Checking" could read them, and use them for the Multiple Address flow, described above. HLS, DASH, or other linked media could be extended. A client device unaware of the Resource Integrity Checking may function under present security models, where, for example, the system is backwards compatible only without the integrity validation.

The network integrity hash usage could be negotiated in an encapsulating protocol such as HTTP, similar to how other formats are negotiated such as HTTP Content-Type and Content-Encoding.

FIG. 5 shows an example method 500 for checking resource integrity. A system and/or computing environment, such as the system 100 of FIG. 1 and/or the computing environment of FIG. 8, may be configured to perform the method 500. The method 500 may be performed in connection with the system illustrated in FIG. 1. Any step or combination of steps of the method 500 may be performed by any of the devices shown in FIG. 1, such as the client device 102, lookup server 104, and/or resource server 106. Any of the features of the methods of FIGS. 2-4 and 6-7 may be combined with any of the features and/or steps of the method 500 of FIG. 5.

At step 502, a request for a first network address associated with a first resource may be sent. The request may be sent from a client device. The request may be sent to a lookup server. The first network address may be a universal resource identifier (URI). The lookup server may be a Domain Name System (DNS) lookup, a video manifest generator, a webpage generator, or the like. The client device may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like.

At step 504, the first network address may be received. A portion of the first network address may include a first cryptographic value associated with the first resource. The first network address may be received by the client device. The first network address may be received from the lookup server. The lookup server may determine the first cryptographic value associated with the first resource. The cryptographic value may be a cryptographically secure hash. The cryptographic value may be determined from a specific hashing algorithm or protocol, such as include RIPEMD-160, MD4, MD5, SHA-1, SHA-256, SHA-512, SHA3-224, SHA3-256, SHA3-384, SHA3-512, SHAKE128, and SHAKE256. The lookup server may determine the cryptographic value by computing the cryptographic value in response to a request (e.g., by using one of the aforementioned hashing algorithms) on an as-needed basis, and/or may retrieve an already computed cryptographic value from a database configured to store cryptographic values of resources. The database may be stored locally to the lookup server, or stored on a separate server in communication with the lookup server. To compute the cryptographic value in response to a request on an as-needed basis, the lookup server may download the resource and/or data associated with the resource to input into the hashing algorithm.

At step 506, a request for the first resource may be sent based on the first network address. The request may be sent from the client device. The request may be sent to a resource server. The request may be received by the resource server. At step 508, data in response to the request for the first resource may be received. The data may include a second resource. The data may be received by the client device.

At step 510, it may be determined whether the first cryptographic value matches a second cryptographic value associated with the second resource. The first cryptographic value may match the second cryptographic value if they are equal. The second cryptographic value may be associated with the second resource. The determination may be made by the client device. The determination may be made by comparing the first cryptographic value to the second cryptographic value. The second cryptographic value may be determined using the same hash function used to determine the first cryptographic value. The second cryptographic value may be determined by the client device. If the first and second cryptographic values match, this may be an indication that the resource received is legitimate and was not altered or manipulated by a malicious attacker. The matching cryptographic values may indicate the first and second resources are the same. If the requested and received resources are matching, the client device may cause the resource to be output to a user of the client device. If the first and second cryptographic values are not the same, this may be an indication that the resource request sent from the client device was altered, and that the client device did not receive the resource requested.

Figure 6:
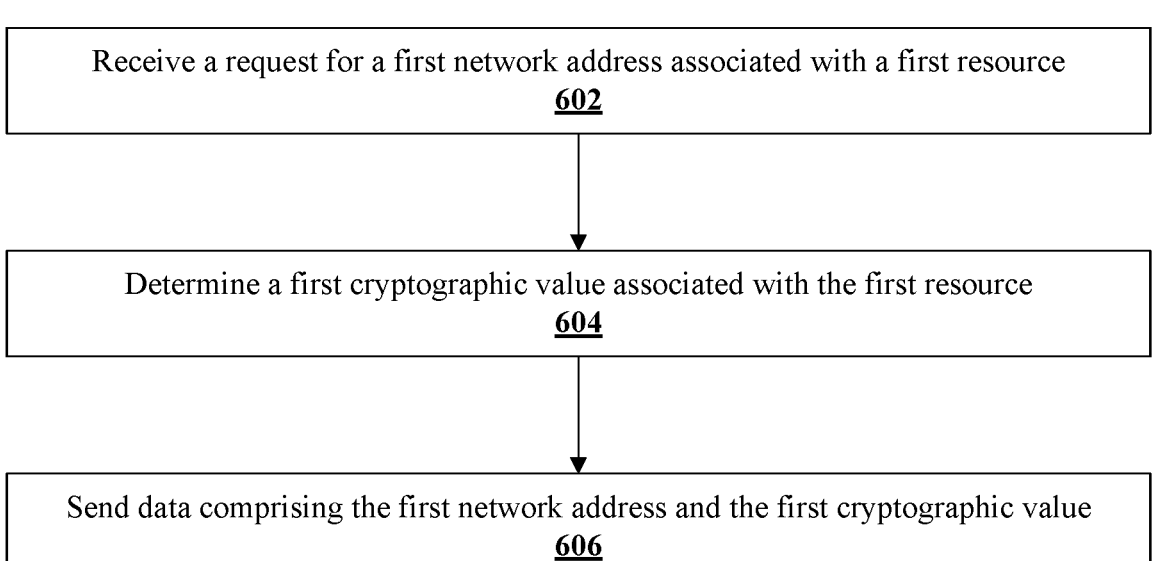
FIG. 6 shows an example flow diagram for checking resource integrity.

FIG. 6 shows an example method 600 for checking resource integrity. A system and/or computing environment, such as the system 100 of FIG. 1 and/or the computing environment of FIG. 8, may be configured to perform the method 600. The method 600 may be performed in connection with the system illustrated in FIG. 1. Any step or combination of steps of the method 600 may be performed by any of the devices shown in FIG. 1, such as the client device 102, lookup server 104, and/or resource server 106. Any of the features of the methods of FIGS. 2-5 and 7 may be combined with any of the features and/or steps of the method 600 of FIG. 6.

At step 602, a request for a first network address associated with a first resource may be received. The request may be received from a client device. The request may be received by a lookup server. The first network address may be a universal resource identifier (URI). The lookup server may be a Domain Name System (DNS) lookup, a video manifest generator, a webpage generator, or the like. The client device may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like.

At step 604, a first cryptographic value associated with the first resource may be determined. The first cryptographic value may be determined by the lookup server. The cryptographic value may be a cryptographically secure hash. The cryptographic value may be determined from a specific hashing algorithm or protocol, such as include RIPEMD-160, MD4, MD5, SHA-1, SHA-256, SHA-512, SHA3-224, SHA3-256, SHA3-384, SHA3-512, SHAKE128, and SHAKE256. The lookup server may determine the cryptographic value by computing the cryptographic value in response to a request (e.g., by using one of the aforementioned hashing algorithms) on an as-needed basis, and/or may retrieve an already computed cryptographic value from a database configured to store cryptographic values of resources. The database may be stored locally to the lookup server, or stored on a separate server in communication with the lookup server. To compute the cryptographic value in response to a request on an as-needed basis, the lookup server may download the resource and/or data associated with the resource to input into the hashing algorithm.

At step 606, data comprising the first network address and the first cryptographic value may be sent. The data may be sent from the lookup server. The data may be sent to the client device. The first cryptographic value may be joined with the first network address. The first cryptographic value may be appended to the first network address. The client device may be configured to send a request for the first resource based on the first network address and the first cryptographic value. The client device may be configured to receive data in response to the request. The data may include a second resource. The client device may be configured to determine a second cryptographic value (e.g., cryptographic hash) associated with the second resource. The second cryptographic value may be determined using the same hash function used to determine the first cryptographic value. The client device may be configured to compare the first cryptographic value with the second cryptographic value. If the first and second cryptographic values match, this may be an indication that the second resource received is legitimate and was not altered or manipulated by a malicious attacker.

Based on the matching cryptographic values, a determination may be made that the first and second resources are the same. If the requested and received resources are matching, the client device may cause the resource to be output to a user of the client device. If the first and second cryptographic values are not the same, this may be an indication that the resource request sent from the client device was altered, and that the client device did not receive the resource requested. If the first and second cryptographic values are not the same, the client device may output an error to the user, send a message to a server indicating the error, terminate a process (e.g., end playback of content, stop downloading a file or content stream), and/or the like.

FIG. 7 shows an example method 700 for checking resource integrity. A system and/or computing environment, such as the system 100 of FIG. 1 and/or the computing environment of FIG. 8, may be configured to perform the method 700. The method 700 may be performed in connection with the system illustrated in FIG. 1. Any step or combination of steps of the method 700 may be performed by any of the devices shown in FIG. 1, such as the client device 102, lookup server 104, and/or resource server 106. Any of the features of the methods of FIGS. 2-6 may be combined with any of the features and/or steps of the method 700 of FIG. 7.

At step 702, a first network address associated with a first resource may be determined. The first network address may be determined by a lookup server. The determination of the first network address may be made in response to a request for the first network address. The request may be received from a client device. The first network address may be a universal resource identifier (URI). The lookup server may be a Domain Name System (DNS) lookup, a video manifest generator, a webpage generator, or the like. The client device may comprise a gateway, a set top box, a digital streaming device, a mobile device, a smart device (e.g., a smart watch, smart apparel, smart glasses, a smart phone, a smart appliance), a tablet, a computing station, a home security system, an onboard media system, and/or the like.

At step 704, a first cryptographic value associated with the first resource may be determined. The first cryptographic value may be determined by the lookup server. The cryptographic value may be a cryptographically secure hash. The cryptographic value may be determined from a specific hashing algorithm or protocol, such as include RIPEMD-160, MD4, MD5, SHA-1. SHA-256, SHA-512, SHA3-224, SHA3-256, SHA3-384, SHA3-512, SHAKE128, and SHAKE256. The lookup server may determine the cryptographic value by computing the cryptographic value in response to a request (e.g., by using one of the aforementioned hashing algorithms) on an as-needed basis, and/or may retrieve an already computed cryptographic value from a database configured to store cryptographic values of resources. The database may be stored locally to the lookup server, or stored on a separate server in communication with the lookup server. To compute the cryptographic value in response to a request on an as-needed basis, the lookup server may download the resource and/or data associated with the resource to input into the hashing algorithm.

At step 706, the first network address may be modified to include the first cryptographic value. The first cryptographic value may be joined with the first network address. The first cryptographic value may be appended to the first network address. The modified first network address may be a unique address identifier.

At step 708, the modified first network address may be sent. The modified first network address may be sent from the lookup server. The modified first network address may be sent to the client device. The client device may be configured to send a request for the first resource based on the modified first network address. The client device may be configured to receive data in response to the request for the first resource. The data in response to the request for the first resource may include the second resource. The client device may be configured to determine a second cryptographic hash associated with the second resource. The second cryptographic value may be determined using the same hash function used to determine the first cryptographic value. The client device may be configured to compare the first cryptographic value with the second cryptographic value. If the first and second cryptographic values match, this may be an indication that the resource received is legitimate and was not altered or manipulated by a malicious attacker. Based on matching cryptographic values, a determination may be made that the first and second resources are the same. If the requested and received resources are matching, the client device may cause the resource to be output to a user of the client device. If the first and second cryptographic values are not the same, this may be an indication that the resource request sent from the client device was altered, and that the client device did not receive the resource requested. If the first and second cryptographic values are not the same, the client device may output an error to the user, send a message to a server indicating the error, terminate a process (e.g., end playback of content, stop downloading a file or content stream), and/or the like.

Figure 8:
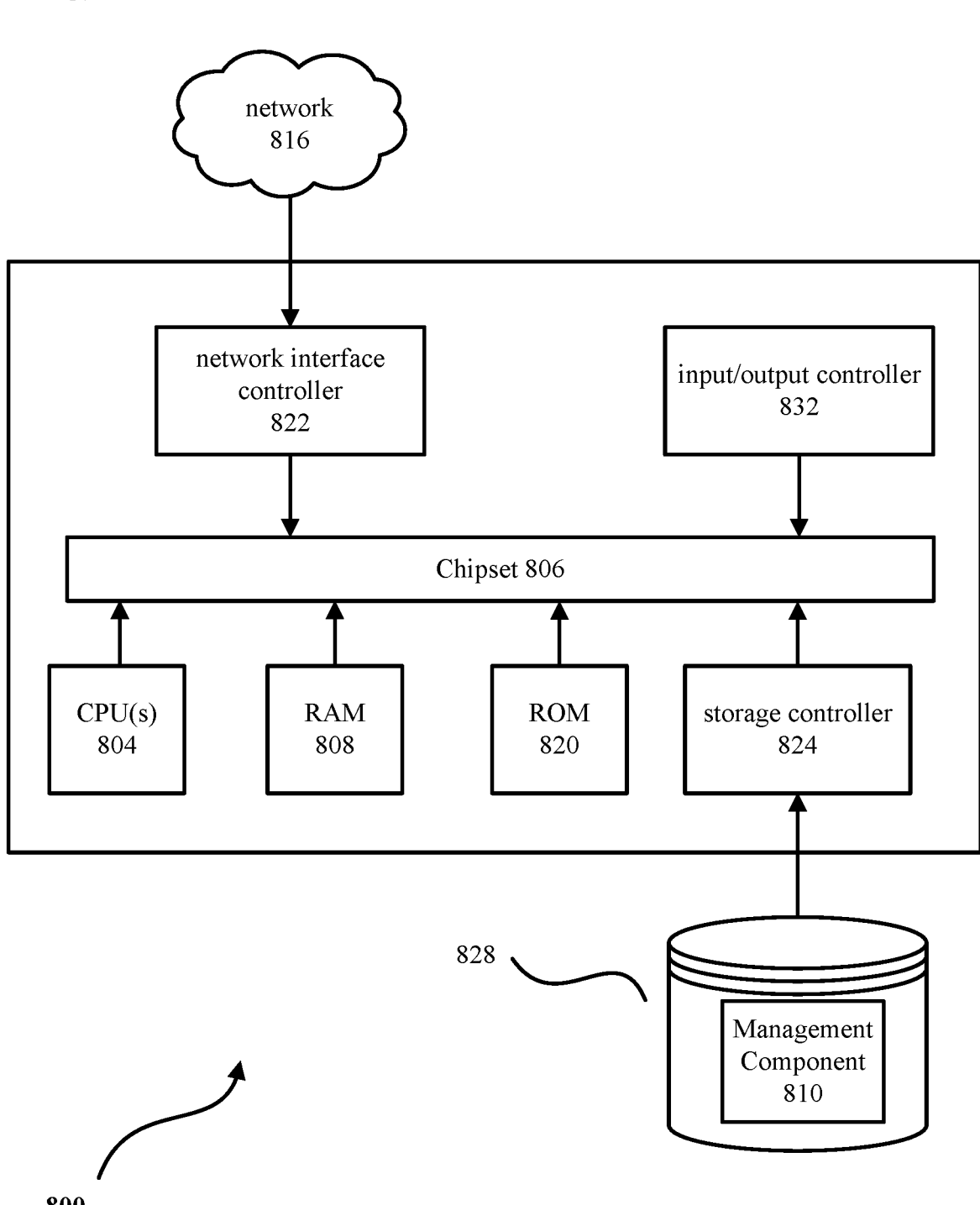
FIG. 8 shows an example computing system.

FIG. 8 shows an example computer architecture for a computing system 800 capable of executing software for performing operations as described above in connection with FIGS. 1-7. It will be appreciated that the described processes may be performed by any suitable system components including, for example, by discrete computing systems that communicate over a communications link. The computer architecture shown in FIG. 8 illustrates a conventional server computer, workstation, desktop computer, laptop, tablet, network appliance, PDA, e-reader, digital cellular phone, or other computing node, and may be utilized to execute any aspects of the software components presented herein.

The computer 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. CPUs 804 may be standard programmable processors that perform arithmetic and logical operations necessary for the operation of computer 800.

The CPUs 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The chipset 806 may provide an interface between the CPUs 804 and the remainder of the components and devices on the baseboard. The chipset 806 may provide an interface to a random access memory (RAM) 808 used as the main memory in the computer 800. The chipset 806 may provide an interface to a computer-readable storage medium, such as a read-only memory (ROM) 820 or non-volatile RAM (NVRAM) (not shown), for storing basic routines that may help to start up the computer 800 and to transfer information between the various components and devices. The ROM 820 or NVRAM may store other software components necessary for the operation of the computer 800 in accordance with the embodiments described herein.

The computer 800 may operate in a networked environment using logical connections to remote computing nodes and computer systems through a LAN 816. The chipset 806 may include functionality for providing network connectivity through a network interface controller (NIC) 822, such as a gigabit Ethernet adapter. The NIC 822 may be capable of connecting the computer 800 to other computing nodes over the LAN 816. It should be appreciated that multiple NICs 822 may be present in the computer 800, connecting the computer to other types of networks and remote computer systems.

The computer 800 may be connected to a mass storage device 828 that provides non-volatile storage for the computer. The mass storage device 828 may store system programs, application programs, other program modules, and data, which have been described in greater detail herein. The mass storage device 828 may be connected to the computer 800 through a storage controller 824 connected to the chipset 806. The mass storage device 828 may comprise of one or more physical storage units. The storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the mass storage device 828 by transforming the physical state of the physical storage units to reflect the information being stored. The specific transformation of a physical state may depend on various factors and on different implementations of the present description. Examples of such factors may include, but are not limited to, the technology used to implement the physical storage units and whether mass storage device 828 is characterized as primary or secondary storage and the like.

For example, the computer 800 may store information to the mass storage device 828 by issuing instructions through the storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate the present description. The computer 800 may read information from the mass storage device 828 by detecting the physical states or characteristics of one or more particular locations within the physical storage units.

The computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 800.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

The mass storage device 828 may store an operating system utilized to control the operation of the computer 800. The operating system may comprise a version of the LINUX operating system. The operating system may comprise a version of the WINDOWS SERVER operating system from the MICROSOFT Corporation. The operating system may comprise a version of the UNIX operating system. It should be appreciated that other operating systems may be utilized. The mass storage device 828 may store other system or application programs and data utilized by the computer 800, such as the management component 810 and/or the other software components described above. The management component may be configured to implement the methods and systems described herein.

The mass storage device 828 or other computer-readable storage media may be encoded with computer-executable instructions, which, when loaded into the computer 800, transforms the computer from a general-purpose computing system into a special-purpose computer capable of implementing the embodiments described herein. These computer-executable instructions transform the computer 800 by specifying how the CPUs 804 transition between states, as described above. The computer 800 may have access to computer-readable storage media storing computer-executable instructions, which, when executed by the computer 800, may perform operating procedures described above in connection with FIGS. 2-7.

The computer 800 may include an input/output controller 832 for receiving and processing input from a number of input devices, such as a keyboard, a mouse, a touchpad, a touch screen, an electronic stylus, or other type of input device. Similarly, the input/output controller 832 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Accordingly, systems and methods have been described that provide device pairing and authentication. The described systems and methods allow for devices to confirm that communications are being performed with, and processing provided by, an intended device. It will be appreciated that while example embodiments have been described in the context of devices that perform sensitive or secure processing, the intended embodiments extend to devices or components that perform processing for any suitable purpose.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may be practiced in distributed computing environments, where tasks are performed by remote processing devices that are linked through a communications network. In a distributed computing environment, program modules may be located in both local and remote memory storage devices.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of the present disclosure. In addition, certain method or process blocks may be omitted in some implementations. The methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may be stored (e.g., as software instructions or structured data) on a computer-readable medium, such as a hard disk, a memory, a network, or a portable media article to be read by an appropriate drive or via an appropriate connection. The systems, modules, and data structures may be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may take other forms in other embodiments. Accordingly, the present methods and systems may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. The term "or" is used in its inclusive sense, and not in its exclusive sense, so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method comprising: sending, from a client device, to a lookup server, a request for a first network address associated with a first resource; receiving, by the client device, the first network address, wherein a portion of the first network address comprises a first cryptographic value associated with the first resource; sending, from the client device, to a resource server, based on the first network address, a request for the first resource; receiving, by the client device, data in response to the request for the first resource, wherein the data comprises a second resource; determining, by the client device, a second cryptographic value associated with the second resource; determining, by the client device, whether the first cryptographic value matches a second cryptographic value; and determining, by the client device and based on whether first cryptographic value matches the second cryptographic value, that the second resource is the first resource.

2. The method of claim 1, wherein the first cryptographic value is an output of a hash function, and the second cryptographic value is an output of the hash function.

3. The method of claim 1, further comprising receiving, by the client device and from the lookup server, data indicating a hash function used to determine the first cryptographic value.

4. The method of claim 1, wherein the first network address comprises Internet Protocol version 6 (IPv6) addresses.

5. The method of claim 1, wherein the lookup server comprises a domain name system (DNS) lookup service.

6. The method of claim 1, further comprising determining, based on the first and second cryptographic values, that the received data was received from the resource server.

7. The method of claim 1, further comprising causing, based on the first and second cryptographic values matching, output of the second resource on the client device.

*    *    *    *    *